(12) United States Patent
Chang et al.

(10) Patent No.: US 6,514,781 B2
(45) Date of Patent: Feb. 4, 2003

(54) MAINTAINING THE STATE OF A MEMS DEVICE IN THE EVENT OF A POWER FAILURE

(75) Inventors: Mark W. Chang, Palos Verdes, CA (US); Scott D. Dalton, Berkeley, CA (US); Michael J. Daneman, Pacifica, CA (US); Timothy Beerling, Berkeley, CA (US); Stephen F. Panyko, Novato, CA (US); Gary M. Zalewski, Oakland, CA (US)

(73) Assignee: Onix Microsystems, Inc., Richmond, CA (US)

( * ) Notice: Subject to any disclaimer, the term of this patent is extended or adjusted under 35 U.S.C. 154(b) by 0 days.

(21) Appl. No.: 09/900,841

(22) Filed: Jul. 7, 2001

(65) Prior Publication Data

US 2003/0008420 A1 Jan. 9, 2003

(51) Int. Cl.$^7$ ............................................. H01L 21/00
(52) U.S. Cl. ..................... 438/19; 438/253; 257/218; 257/420
(58) Field of Search ..................... 438/4, 466, 127, 438/17, 458, 19; 257/618, 420

(56) References Cited

U.S. PATENT DOCUMENTS 6,112,273 A * 8/2000 Kau .................. 710/260
6,122,232 A * 9/2000 Schell ................ 369/41.11
6,266,306 B1 * 7/2001 Schell ................ 369/44.34

* cited by examiner

Primary Examiner—John F. Niebling
Assistant Examiner—André C. Stevenson
(74) Attorney, Agent, or Firm—JDI Patent; Joshua D. Isenberg

(57) ABSTRACT

A method and apparatus for maintaining the state of a MEMS device in the event of a power failure are disclosed. The apparatus and method may be used with a MEMS device generally having one or more MEMS elements moveably coupled to a substrate that uses electrostatic clamping force to sustain the state of the MEMS element. According to the method, a capacitive or other charge-storing circuit is coupled between a clamping surface and an electrical ground. During normal operation, a clamping voltage is applied between the clamping surface and at least one MEMS element to retain the at least one MEMS element against the clamping surface. In the event of a power failure, the source of the clamping voltage and other circuit paths to ground are isolated from the clamping surface. The charge-storing circuit maintains an electric charge on the clamping surface. Leaky circuit paths to ground may be isolated from the clamping surface by an isolator element configured to electrically isolate the clamping surface in the event of a power failure. The isolator element may include an opto-isolator or a low leakage diode.

34 Claims, 7 Drawing Sheets

MAINTAINING THE STATE OF A MEMS DEVICE IN THE EVENT OF A POWER FAILURE

FIELD OF THE INVENTION

This invention is related to MEMS devices. More particularly, this invention is related to maintaining the state of a MEMS device in the event of a power failure.

BACKGROUND OF THE INVENTION

Modern communications systems require a level of robustness that protects the state of the optical switches from being lost in the event of a power failure. Recently, microelectromechanical systems (MEMS) devices have been developed for optical switching. MEMS devices are miniature mechanical devices manufactured using the techniques developed by the semiconductor industry for integrated circuit fabrication. MEMS optical switches typically include an array of mechanically actuatable mirrors that deflect light from one optical fiber to another. The mirrors are configured to translate or rotate into the path of the light from the fiber. Mirrors that rotate into the light path generally rotate about a substantially horizontal axis, i.e., they "flip up" from a horizontal position into a vertical position. MEMS mirrors of this type are usually actuated by magnetic interaction, electrostatic interaction, thermal actuation or some combination of these. The MEMS mirrors may be retained in the "up" position by an electrostatic clamping voltage. In the event of a power failure, the clamping voltage may be lost and any MEMS mirrors that were clamped may return to the "down" position under the influence of mechanical restoring forces. In this manner, the state of the switch may be lost in the event of a power failure.

The problem is illustrated through an example shown in FIG. 1, which depicts a schematic diagram of a MEMS apparatus according to the prior art. The depicted apparatus generally includes a MEMS optical switch 100. The optical switch 100 has a substrate 102, and a moveable element 104 moveably coupled to the substrate 102. The moveable element 104 may be one of several such moveable elements that are moveably coupled to the substrate 102. The moveable element 104 moves between a horizontal "OFF" position (shown in phantom) and a vertical "ON" position. In the "ON" position, the moveable element 104 is retained against a top chip 106. In this example, the top chip 106 is electrically isolated from the substrate 102, and all other MEMS elements, and a clamping voltage, e.g., +40 V, is applied between the moveable element 104 and the top chip 106. In the apparatus shown in FIG. 1 the clamping voltage difference is supplied by a high voltage source, such as a DC-DC converter 130 and a high voltage driver 120. The high voltage driver 120 is essentially an electronic switch for addressing and selectively coupling a plurality of moveable elements 104 to the voltage potential output by the DC-DC converter 130 or to ground. In this example, the output of the DC-DC converter is also coupled directly to the top chip 106. Thus, the top chip 106 sustains a clamping voltage as long as power is supplied to the DC-DC converter 130. The high voltage driver 120 may be controlled by a microcontroller 110, e.g., a PIC microcontroller to set a voltage potential for each movable element 104 configured in an optical cross-connect switch matrix. Depending on the required state of the switching element 100, a voltage difference may exist between the moveable element 104 and one or more clamping structures. The clamping structure may clamp the movable element in a state and may also provide a mechanical stop to accurately align and fix the movable element in the required state. A top chip may be assimilated herein for purposes of examples shown, as an electrostatic clamping surface having a global mechanical stop to accurately align the movable element in the ON state. In this example, the top chip 106, charged to some electrostatic potential ($V_{clamp}$), provides the mechanical stop and clamps the moveable element 104 when the moveable element 104 is electronically connected to zero voltage (ground) through the high voltage driver. Alternatively, when the output of a high voltage driver coupled to the movable element 104 is set to $V_{clamp}$ through the high voltage driver 120, no clamping voltage difference is present between the top chip 106 and the moveable element 104 and thus the moveable element 104 is allowed to fall back to the OFF state. It is also important to note in this example that in the clamped state, a small insulating gap, such as an air gap, is maintained between the top chip and the moveable element in order to maintain electrical isolation between the two surfaces.

In the event of a power failure in the example shown, the microcontroller 110 no longer receives the logic voltage Vcc and, therefore, can no longer control the high voltage driver 120. Although the top chip 106 is electrically isolated from the other MEMS elements, the DC-DC converter 130 and high voltage driver 120, both sharing the same circuit node as the top chip 106, may be resistively coupled to ground. The coupling of the top chip 106 to these circuits causes charge to leak from the top chip 106 to ground. If the leakage of charge is sufficiently large, the voltage difference between the top chip 106 and the moveable element 104 will quickly be reduced to a level insufficient to retain the moveable element 104 against the top chip 106. The moveable element 104 then returns to the "OFF" position interrupting any optical signal that may be deflected by the moveable element 104. Even when power is restored, the state of the MEMS device 100 will not be recovered since the clamping voltage does not actuate the moveable element 104.

Thus, there is a need in the art, for a method of maintaining the state of a MEMS device in the event of a power failure and an apparatus for implementing such a method.

SUMMARY OF THE INVENTION

The disadvantages associated with the prior art are overcome by a method and apparatus for maintaining the state of a MEMS device in the event of a power failure. The MEMS device generally has one or more MEMS elements moveably coupled to a substrate and a clamping surface that may be electrically isolated from all other MEMS elements. According to the method, an adequately sized charge storage device is connected between the clamping surface and an electrical ground. A clamping voltage applied between a clamping surface and at least one MEMS element retains the at least one MEMS element against the clamping surface. In the event of a power failure, all potentially leaky circuit paths to ground are isolated from the clamping surface, with the exception of the charge storage device that serves to maintain the electrostatic clamping voltage.

The apparatus generally comprises a charge-storing circuit, e.g., a capacitive circuit or battery permanently connected between the clamping surface and an electrical ground and an isolator element electrically connected between the clamping surface and all other circuits sharing the same node as the clamping surface (e.g., a top chip). The isolator element is configured to electrically isolate all potentially leaky circuit paths from the clamping surface in the event of a power failure. The isolator element may include an opto-isolator, diode or other circuit capable of providing low-leakage electrical isolation.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
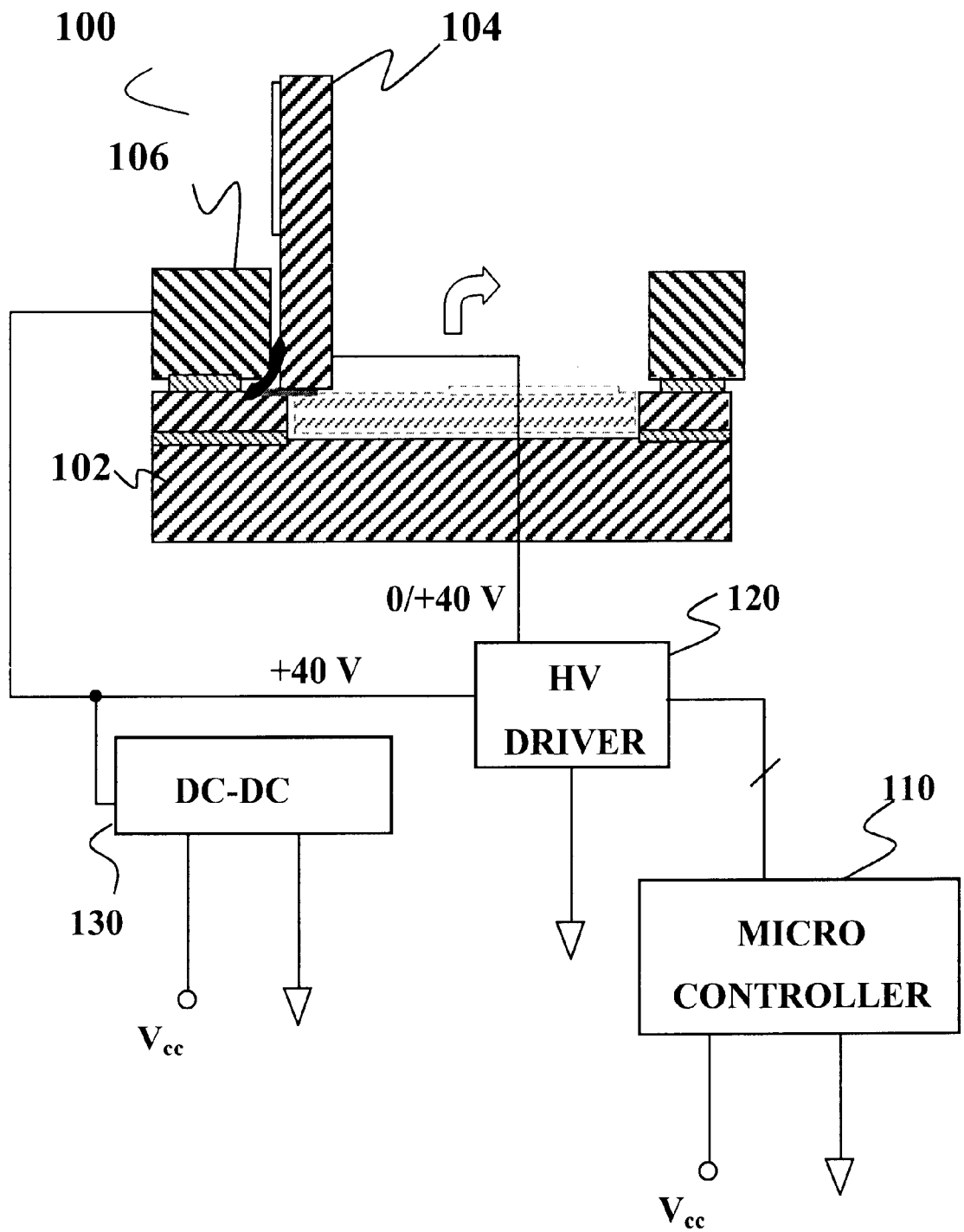
FIG. 1 is a schematic diagram of a MEMS apparatus according to the prior art.
Figure 2:
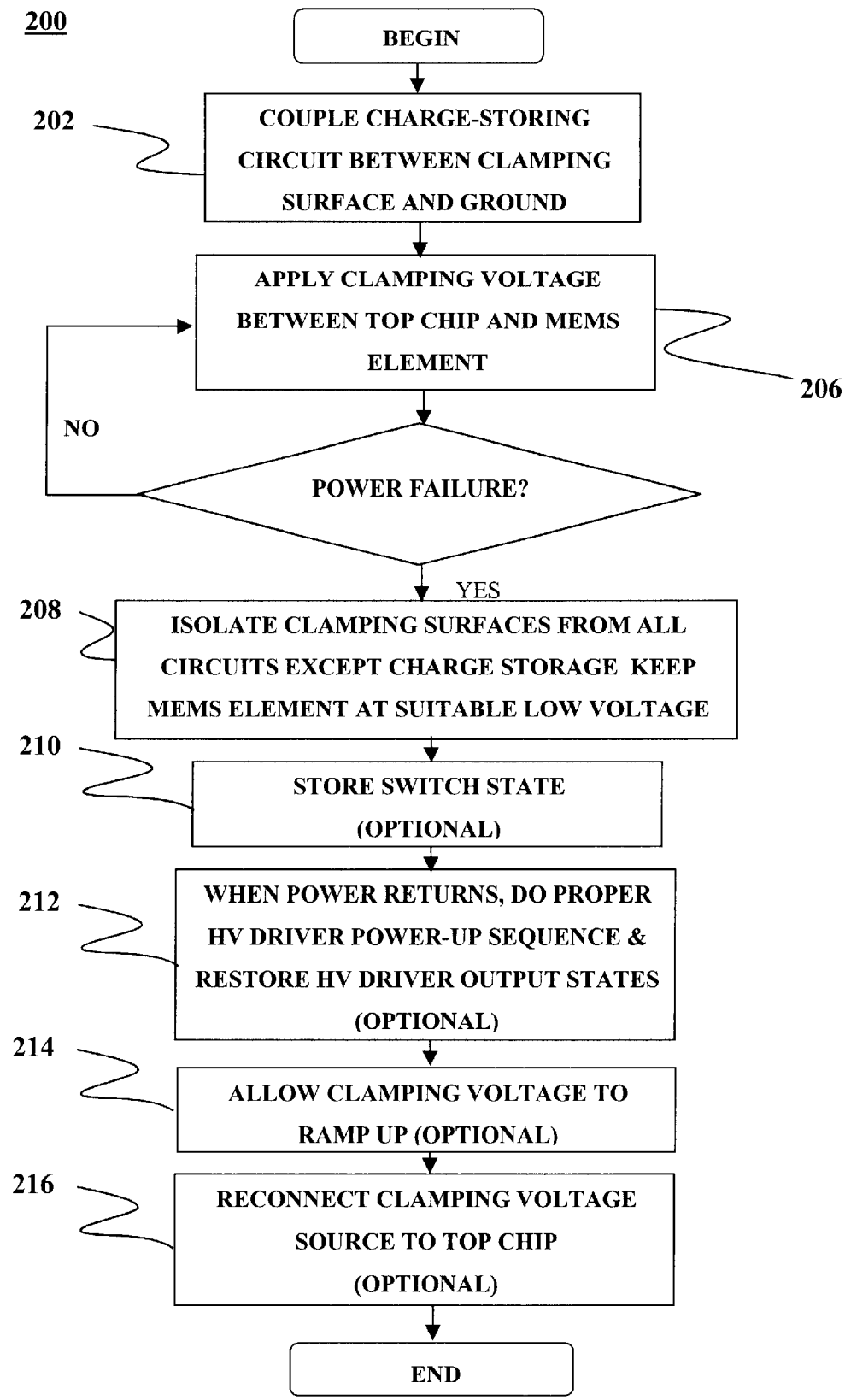
FIG. 2 is a flow diagram of a method of maintaining the state of a MEMS device in the event of a power failure.
Figure 3:
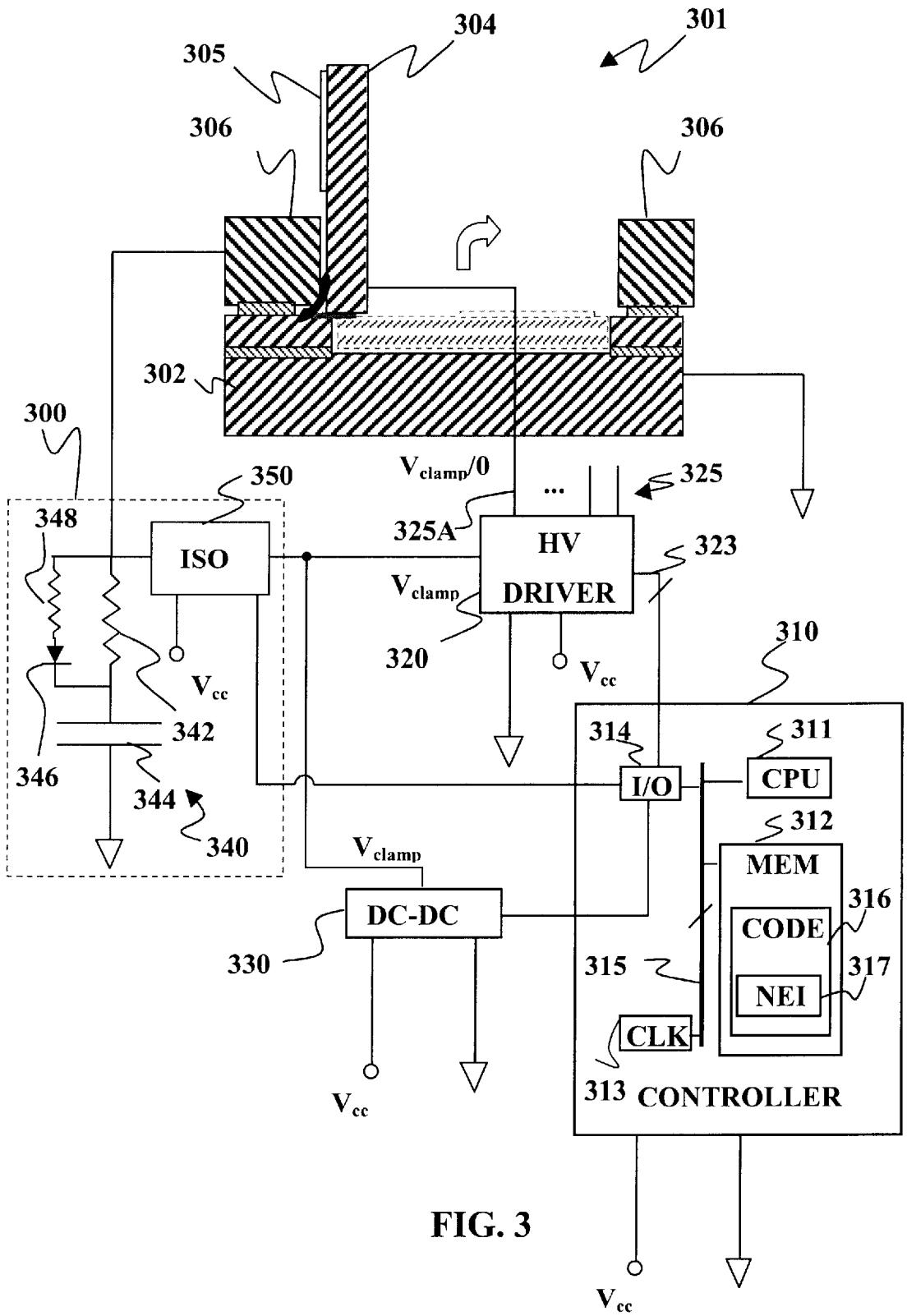
FIG. 3 is a schematic diagram of an apparatus for maintaining the state of a MEMS device in the event of a power failure.

An example of an embodiment of a method 200 of the present invention is depicted in the flow diagram of FIG. 2. The method 200 may be implemented in hardware, in software, or in some combination of both hardware and software. FIG. 3 depicts a schematic diagram of an apparatus 300 that may implement the method of FIG. 2. The operation of the method is perhaps best understood by simultaneously referring to FIG. 2 and FIG. 3. The apparatus 300 generally includes a charge-storing circuit 340 and an isolator circuit (ISO) 350. The apparatus 300 may operate with a MEMS optical switch 301 and associated circuitry of the type shown in FIG. 1. More specifically, the optical switch 301 has a substrate 302, a moveable element 304 moveably coupled to the substrate 302. By way of example, the moveable element 304 may move between a horizontal "OFF" position (shown in phantom) and a vertical "ON" position. In the "ON" position, the moveable element 304 may be retained against a clamping surface 306 whose height is lower than the movable element 304.

Although the moveable element 304 is described herein for purposes of example as assuming a vertical ON position and a horizontal OFF position, the moveable element 304 may assume any orientation in the "ON" and "OFF" positions as long as the moveable element 304 may interact with an optical signal when it is in the "ON" position and may not interact when it is in the OFF position. For purposes of example, the interaction between the moveable element 304 and the optical signal may include sensing, detection, deflection, transmission, wavelength conversion, and combinations thereof.

The clamping surface 306 may be a single vertical wall or two vertical walls having a hole therebetween to allow light to pass. The two vertical walls may each have a height that is higher than the movable element 304. The moveable element may be electrically isolated from the clamping surface 306 by an insulating gap, such as an air gap. The moveable element 304 may include a light-deflecting component 305 that deflects optical signals when the moveable element is in an "ON" position. By way of example, the light-deflecting component 305 may be a mirror, e.g., a simple plane reflecting (or partially reflecting) surface or a curved reflecting (or partially reflecting) surface. Alternatively, the light-deflecting component may be a prismatic reflector, refractive element, prism, lens, diffractive element, e.g. grating or Fresnel lens, a dichroic-coated surface for wavelength specific and bandpass selectivity, a waveguide, photonic emitter, detector, sensor, electronic component, or some combination of these. The moveable element 304 may be one of several such moveable elements that are moveably coupled to the substrate 302, e.g. in an N×N switching fabric. Furthermore, the optical switch 301 may be one of several such optical switches that are part of a switch fabric in an optical communications network (not shown).

The optical switch 301 may operate in response to signals from a controller 310. By way of example, the controller 310 may be a self-contained microcontroller such as a PIC 16F877Microchip available from Microchip Technology, Inc., of Chandler, Ariz. The controller 310 may be configured to include a CPU 311, memory 312 (e.g., RAM, DRAM, ROM, Flash and the like), clock 313 and well-known support circuits such as (I/O) functions 314, all of which may communicate with each other via a system bus 315. The memory 312 may contain instructions that the processor unit 311 executes to facilitate the performance of the switch 301 and apparatus 300. The instructions in the memory 312 may be in the form of the program code 316. The code may include instructions for implementing certain steps of the method 200. The code 316 may conform to any one of a number of different programming languages such as Assembly, C++, JAVA or a number of other languages. The controller 310 typically operates the switch 301 and apparatus 300 through I/O functions 314 in response to data and program code instructions stored and retrieved by the memory 312.

The switch 301, controller 310, high voltage (HV) driver 320, DC-DC converter 330, charge-storing circuit 340 and isolator element 350 may be subsystems or components of a network element e.g., as shown below with respect to FIG. 6. Switch 301 may be configured on a removable card and the network element may be part of a network (see FIG. 6). The controller 310 may include network element interface 317 which may be implemented in software e.g. in a subroutine in memory 312 or hardware to allow the controller 310 to communicate with the network element. Such communication may include, but is not limited to, switching commands issued from the network element to the switch 301 and switch state data transmitted from the switch 301 to the network element.

In the example depicted in FIG. 3, the clamping surface 306 may be a "top chip" having one or more openings that receive the moveable element 304 and\or others like it. The openings may have sidewalls against which the moveable element 304 may be retained. It should also be understood that the term "top chip", as referenced herein, refers to any platform attached to a substrate containing one or more moveable elements to which a movable element may be clamped. One top chip design may be comprised of a single fabricated MEMS structure having an array of 8×8, 16×16 or 32×32 openings that align with each movable element in a corresponding array of moveable elements such as moveable element 304. Another top chip design may be a single or multiple array of high aspect vertical sidewalls; in this case two walls may be associated with each movable element. While it should be understood that a top chip may be located at the bottom or side of the movable element as anticipated by the plurality of design abstractions, it should also be stated that the clamping surface 306 may be part of a single-layer device as opposed to a chip layer bonded to a substrate or base such as substrate 302.

The clamping surface 306 may be electrically charged to an electrostatic potential $V_{clamp}$ with respect to 0 volts (ground), as well as isolated from the substrate 302 and all other MEMS elements. The moveable element 304 may be selectively coupled to either a source of clamping voltage $V_{clamp}$ or to a ground potential, e.g. 0 volts. In an 8×8 switching fabric, a high voltage driver 320 may be a 64 channel latch such as the Supertex HV58908 which contains 64 channels of output 325, each of which may couple to movable switch element such as moveable element 304. Commands sent by the microcontroller 310 are received by the high voltage driver via bus 323 to configure each of the 64 outputs to a HIGH or LOW value. In the example shown in FIG. 3, when channel 325A is set HIGH, the clamping voltage $V_{clamp}$, e.g., 40 volts, is applied to movable element 304 and no electrostatic clamping is realized since the adjacent clamping surface 306 is also at the clamping voltage $V_{clamp}$. However, when channel 325A is set LOW, the movable element 304 is grounded, resulting in electrostatic attraction to the adjacent clamping surface 306 which is set at $V_{clamp}$.

The charge-storing circuit 340 is electrically coupled between a clamping surface and ground to hold a clamping charge on the clamping surface to sustain switch state in the event of power failure. The example charge-storing circuit 340 has a capacitor 344 and an optional series resistor 342. In the event of a power failure, the capacitor 344 sustains a voltage potential on the clamping surface 306 in the event of a power failure to ensure that the configuration of the optical cross connect switch is maintained. In a particular embodiment of the invention, the capacitor 344 has a capacitance that is less than about 20 microfarads ($\mu F$). Although a capacitive charge-storing circuit 340 is depicted in FIG. 3, the charge-storing circuit 340 may alternatively include a battery or other circuit element that is capable of storing an electrical charge.

The series resistor 342 is employed to limit the charge rate of the capacitor at power-up, thus preventing overloading or performance degradation of the clamping voltage source (e.g., DC-DC converter 330). In the case where it is desirable to limit the discharge current flowing from the capacitor 344 into the clamping surface 306 (say, for example, to protect the clamping surface 306 and/or MEMS moveable element 304 from further damage should a short suddenly occur), the series resistor 342 could be suitably modified to provide such limiting. If, as a result of this modification, the resistance of the series resistor 342 becomes so large as to increase the charge time of the capacitor 344 to an unreasonably long period of time, then a diode 346 in series with an additional resistor 348 may optionally be connected across the series resistor 342 in order to control the charging rate of the capacitor 344 independently of the discharge rate.

In some cases it may be desirable for the charge-storing circuit 340 to charge up quickly if this will not overload the DC-DC converter 330 with the charging current. To facilitate this, the charge-storing circuit 340 may optionally include a "one-way" short circuit around the resistor 342, e.g., in the form of a diode configured to provide a low resistance path for charging the capacitor 344 and a high resistance path (compared to that of resistor 342) for discharging the capacitor 344.

The clamping voltage $V_{clamp}$ from the DC-DC converter 330 is coupled to the clamping surface 306 through the isolator circuit 350. In the event of a power failure, the isolator circuit 350 prevents charge from leaking to ground through the DC-DC converter 330 and/or the HV driver 320. The isolator circuit 350 may be coupled to the microcontroller 310. The isolator circuit 350 may be configured to electrically isolate the DC-DC converter 330 and the HV driver 320 from the clamping surface 306 in the event power is lost to the controller 310. The isolator 350 may optionally include connections to a logic voltage $V_{cc}$ and/or ground to facilitate isolation when the logic voltage $V_{cc}$ drops due to a power failure. Furthermore, the isolator 350 may include a connection to the microcontroller 310 so that the controller 310 may signal the isolator circuit 350 to isolate the DC-DC converter 330 and the HV driver 320 from the clamping surface 306 if power is lost to the DC-DC converter 330.

Preferably, the charge-storing circuit 340 and the isolator element 350 have a total current leakage that is low enough that the clamping surface 306 retains sufficient charge to clamp the moveable element 304 for a sufficient period of time depending upon the requirements of the system of which the switch 301 is a part. By way of example this could be as short as a few milliseconds or as long as several days. During this period of time, the clamping voltage $V_{clamp}$ may drop below its initial value. The movable element 304 will still be retained against the clamping surface 306 as long as the clamping voltage remains above some minimum value. The capacitor 344 preferably has a low current leakage across its leads and is made using a high resistance dielectric. Capacitors are generally rated by a capacitance, and a maximum voltage. In general, capacitors having a higher maximum voltage rating tend to exhibit a lower leakage current. A particular example of a capacitor 344 that is suitable for use with a clamping voltage $V_{clamp}$ of about 40V is a model ECQE(F) 10-microfarad ($\mu F$) 250-volt metallized polyester capacitor made by Panasonic of Osaka, Japan. Testing has shown this device to sustain over 168 hours of clamping voltage to 64 movable mirror elements in a prototype 8×8 optical cross-connect switching fabric.

Figure 4:
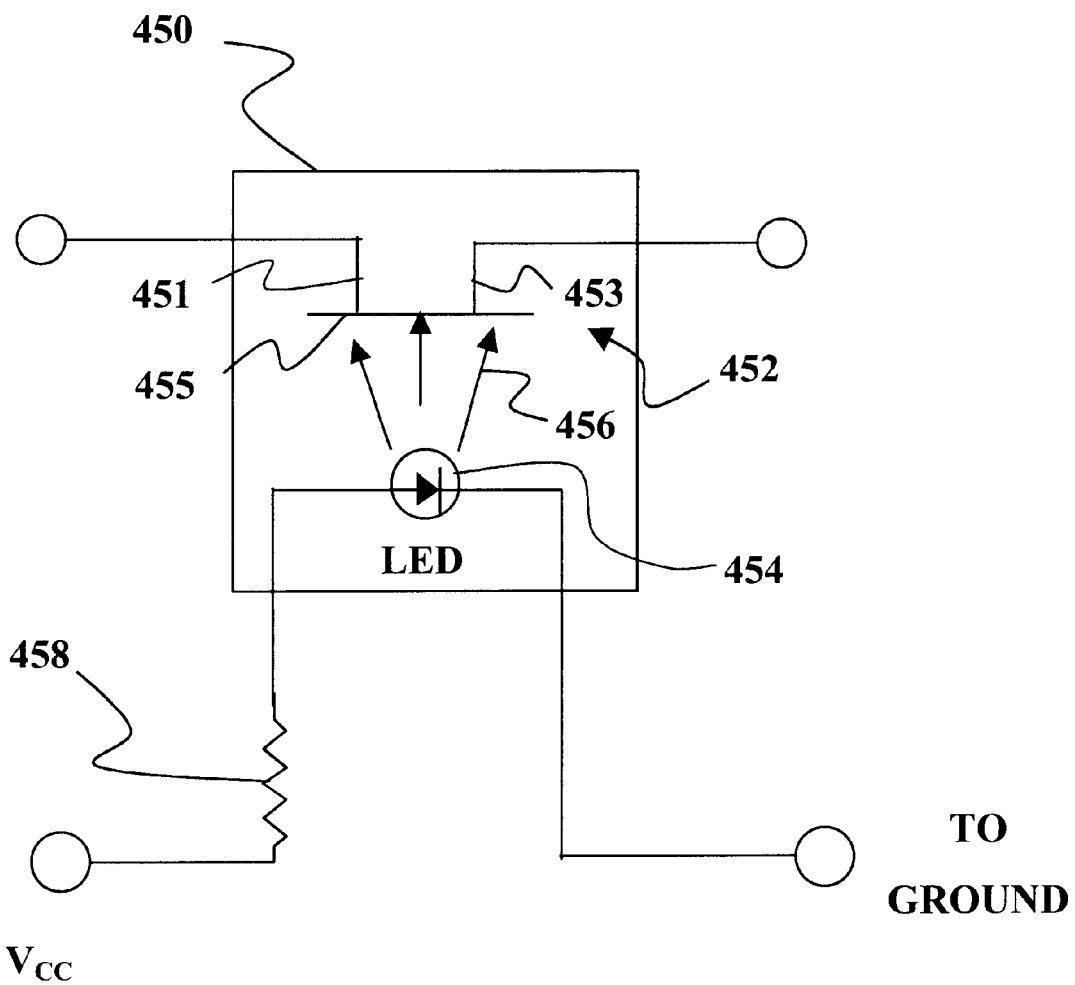
FIG. 4 is a schematic diagram of a first alternative isolator circuit that may be used in the apparatus of FIG. 3.

By way of example, the isolator element 350 may be an opto-isolator. FIG. 4 depicts a schematic diagram of an example of an opto-isolator 450 that may be used as the isolator element 350 of FIG. 3. The opto-isolator 450 generally includes a phototransistor 452 and a source 454 of light 456. As used herein, the term "phototransistor" refers to a circuit element that is electrically conductive in response to light and electrically isolating in the absence of light. By way of example, the phototransistor 452 includes a source 451, a drain 453 and a gate 455. As long as light 456 from the source 454 impinges on the gate 455 of the phototransistor 452 electric current may flow between the source 451 and the drain 453. As used herein the term "light" generally refers to electromagnetic signals that may be transmitted through free space or through a dielectric medium. As such, the term "light" includes, but is not limited to, infrared light, visible light, ultraviolet light, and the like. The source 454 provides light 456 as long as long as power is on, e.g., there is a voltage difference across the LED. Thus current may flow through the phototransistor as long as the power is on. By way of example, the source 454 may be a light emitting diode (LED). The LED may be coupled between $V_{CC}$ and ground. The $V_{CC}$ connection may be provided by one of the I/O functions 314 of the controller 310 or a separate power supply. Furthermore the ground connection may be provided through the controller 310 or a separate ground connection. A resistor 458 may be coupled in series with the LED to limit an electrical current through the LED. For a clamping voltage $V_{clamp}$ of 40 V, an example of a suitable opto-isolator is a model AQV225N(A) Photo-MOS relay manufactured by Aromat Corporation of San Jose, Calif.

Figure 5:
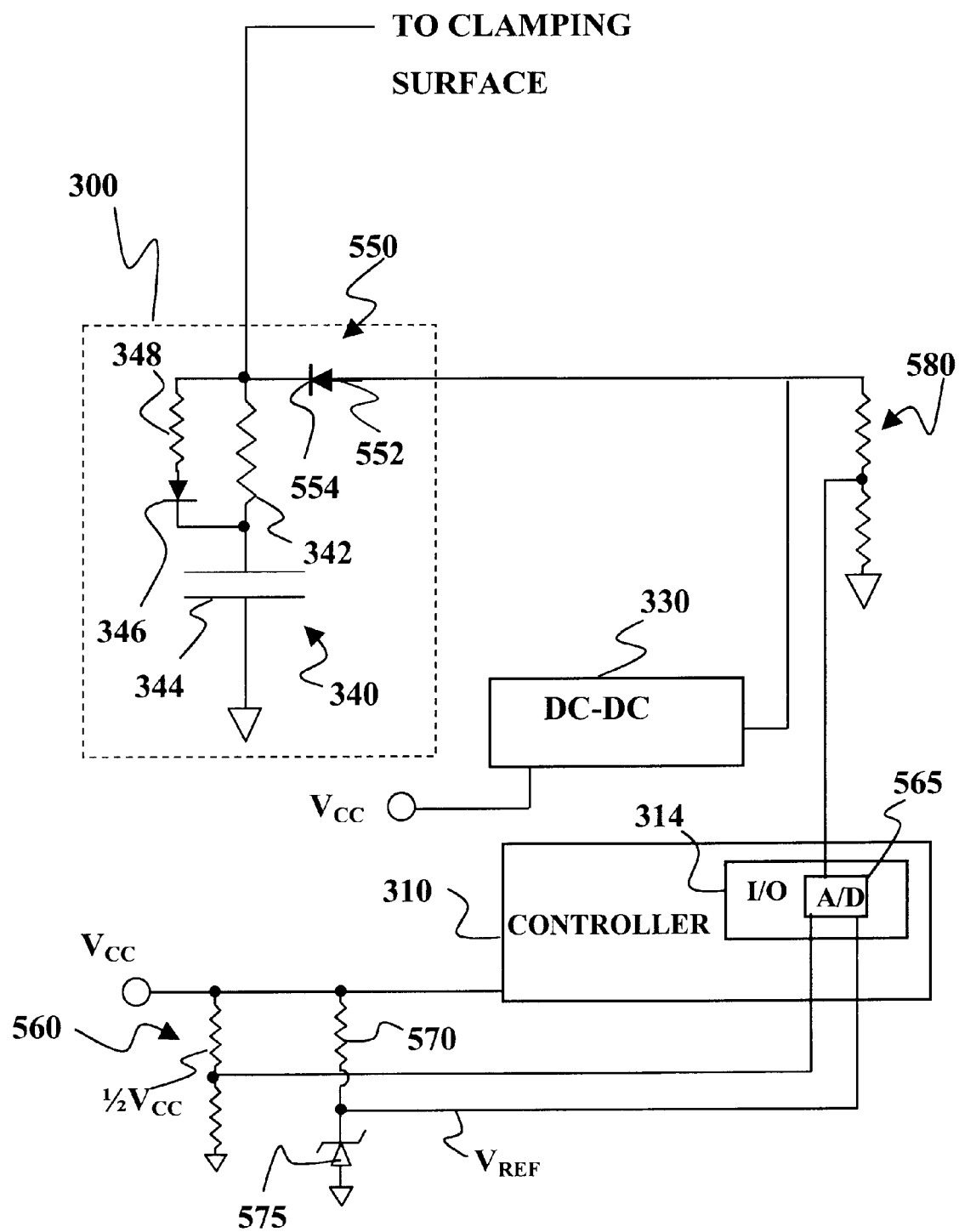
FIG. 5 is a schematic diagram of a second alternative isolator circuit that may be used in the apparatus of FIG. 3.

Alternatively, the isolator element 350 may be a low leakage diode. If the isolator element 350 is a low leakage diode, connection to the controller 310 is not required. FIG. 5 depicts a partial schematic diagram illustrating the how a low leakage diode 550 would be incorporated into the apparatus of FIG. 3 as the isolator element 350. The diode 550 has an anode 552 and a cathode 554. The diode 550 easily conducts electric charge flowing from the anode to the cathode and is highly isolating for electric charge attempting to flow from the cathode 554 to the anode 552. The anode may be connected to the DC-DC converter 330 and the high voltage driver 320. The cathode 554 may connect to the charge-storing circuit 340 such that the resistor 342 and the capacitor 344 are between the cathode 554 and ground. The cathode may be connected to the clamping surface 306. In this configuration, the diode 550 allows electric charge to flow to the clamping surface 306 from the DC-DC converter 330 but inhibits charge from flowing from the clamping surface 306 through the DC-DC converter 330 or through the HV driver 320 to ground. For a clamping voltage $V_{clamp}$ of about 40 V, an example of a suitable low leakage diode is a model BAS116 Low Leakage Diode manufactured by Phillips Corporation of Eindhoven, The Netherlands. Alternatively, the diode 550 may be replaced with a high isolation transistor, such as a field effect transistor (FET) or bipolar transistor having sufficiently low leakage. Alternatively an Analog Switch or Multiplexer (MUX) may be used to provide an equivalent function to that of the diode 550.

Power failure detection may be implemented by real-time monitoring of voltage levels through an A/D pin on controller 310. The code 316 may include software for analyzing voltage over time to calculate slope trends and track the sharp voltage drop that occurs at the instant that power is failing so that the system controller can take action in response to the power failure event. Monitoring may be facilitated by an analog to digital (A/D) converter 565, which may be implemented as one or more of the I/O circuits 314 of the controller 310. By way of example, the controller 310 may sense a loss of power by comparing the logic voltage level $V_{CC}$ to a reference voltage level $V_{REF}$. Such a comparison may be implemented, for example, by use of a voltage divider network 560, a resistor 570, and a Zener diode 575. The voltage divider network 560 is coupled between a source of logic voltage $V_{CC}$ and ground. The voltage divider network 560 is coupled to the controller 310, e.g., through the A/D converter 565. The voltage divider network 560 provides a voltage that is some known fraction of the actual voltage from the source of logic voltage, e.g., $\frac{1}{2}V_{CC}$. Thus, if the source provides a $V_{CC}$ level of 5 volts, the voltage divider network 560 provides 2.5 volts. If the $V_{CC}$ level drops to 4.0 volts, the voltage divider network 560 provides 2.0 volts. The resistor 570 and Zener diode 575 provide a reference voltage $V_{REF}$ that is substantially fixed, e.g., at 2.5 volts. An example of a suitable Zener diode is a model ZRC25OF01 from Zetex of Oldham, United Kingdom. The reference voltage $V_{REF}$ is also provided from the Zener diode 575 to the controller 310, e.g. via the A/D converter 565. The controller 310 may then compare the value of $\frac{1}{2}V_{CC}$ to the reference voltage $V_{REF}$. If the value of $V_{CC}$ drops due to a power failure the value of $\frac{1}{2}V_{CC}$ also drops, but the Zener diode 575 retains the reference voltage $V_{REF}$ at a sufficiently fixed value so that the controller 310 can sense a power failure by comparing $\frac{1}{2}V_{CC}$ to $V_{REF}$.

The controller 310 may also monitor the clamping voltage $V_{clamp}$ provided by the DC-DC converter 330. This is useful, for example, where the controller stabilizes the value of $V_{clamp}$. However, the clamping voltage $V_{clamp}$ lamp may be higher than a maximum voltage that can safely be applied to the A/D converter 565. In such a case it is useful to reduce the voltage provided to the controller 310, e.g., through the use of a voltage divider network 560. Although the voltage divider network 560 and A/D converter 565 are shown in the low leakage diode example of FIG. 5, those skilled in the art will also recognize that a similar voltage divider network may be used with an opto-isolator or other type of isolator 350.

Method 200 of the present inventions begins at step 202 by coupling the charge-storing circuit 340 between the clamping surface 306 and ground. By way of example, the charge-storing circuit 340 may be hard wired to a circuit board containing the controller 310, high voltage driver 320, DC-DC converter 330, or it may be located externally and coupled there said components via standard I/O ports as one skilled in the art would be capable of applying. The isolator element 350 may be hard wired to the circuit board. It is desirable to have a high impedance and low leakage current between the components and ground. To reduce leakage currents it is often desirable to ensure that the various components of the apparatus 300, and the board or substrate to which they are mounted, are clean.

At step 206, a clamping voltage is applied to the clamping surface 306 via the isolator 350, which couples the DC-DC converter 330 to the clamping surface 306. In the example shown, if the moveable element 304 is to be retained in the "ON" position, the high voltage driver 320 may electrically couple the moveable element 304 to ground. The clamping voltage $V_{clamp}$ produces an electric force that retains the moveable element 304 in the "ON" position when the moveable element is connected to ground e.g., through the high voltage driver 320. Although the charge-storing circuit 340 is designed to hold the charge on the clamping surface 306 in the event of a power failure, charge may leak to ground through the DC-DC converter 330 and/or the high voltage driver 320. Therefore, at step 208 it is important to electrically isolate the source of clamping voltage from the clamping surface 306 in the event of a power failure. Furthermore, it is important to keep the MEMS element 304 at a suitably low voltage if the MEMS element 304 is to be clamped to the clamping surface. By way of example, the high voltage driver 320 may simply operate in a "fail safe" mode, in which it couples the MEMS element 304 to ground automatically in the event of a power failure.

Additional actions may be taken in association with step 208, e.g., where the MEMS optical switch 301 is part of a network. Examples of such steps may be understood by simultaneously referring to FIG. 2 and FIG. 6, which illustrates a system 590 according to an alternative embodiment of the present invention. The system 590 generally includes a network element 599 which may be coupled to one or more other network elements 670, 680 via a network 690. The network elements 599, 670, 680 may operate in response to instructions from a network management software 692 coupled to the network 690. The network element 599 includes a switch fabric 600 and other network element components 660. The switch fabric 600 includes an optical switch 601, a controller 610, a high voltage driver 620, a DC-DC converter 630, a charge-storing circuit 640 and an isolator 650. These components may have features in common with the corresponding components described above with respect to FIG. 3 and/or FIG. 5 and may be configured in a similar fashion. The optical switch 601 may include an array of moveable elements 604 that are moveably coupled to a substrate 602. The moveable elements 604 may be selectively clamped to a clamping surface 606, e.g. at top chip, as described above with respect to FIG. 3. For example, the high voltage driver 620 may have a set of outputs 625 that are coupled to the moveable elements 604. The optical switch 601 may operate in response to signals from a controller 610 having features in common with the controller 310 described above. By way of example, the controller 610 may be configured to include a CPU 611, memory 612 input/output (I/O) functions 314, and an analog to digital (A/D) I/O function 619, all of which may communicate with each other via a system bus 615. The A/D I/O function 619 may be coupled to the HV driver 620 and or DC-DC converter 630 to facilitate power failure monitoring. The memory 612 may contain instructions, e.g., in the form of the program code 616. The code 616 may include instructions for implementing certain steps of the method 200. The program code 616 may include network element interface 617 which may be implemented in software e.g. in a subroutine in memory 612 or hardware to allow the controller 610 to communicate with the network element 599 and/or the network 690. Such communication may include, but is not limited to, switching commands issued from the network element 599 to the switch fabric 600 and switch state data transmitted from the switch fabric 600 to the network element 599.

The other network element components 660 may include, but are not limited to multiplexers, demultiplexers, photo detectors, variable optical attenuators, optical amplifiers, packet routers, optical-electronic-optical (OEO) components, such as non-optical routers, port cards, and the like.

Figure 6:
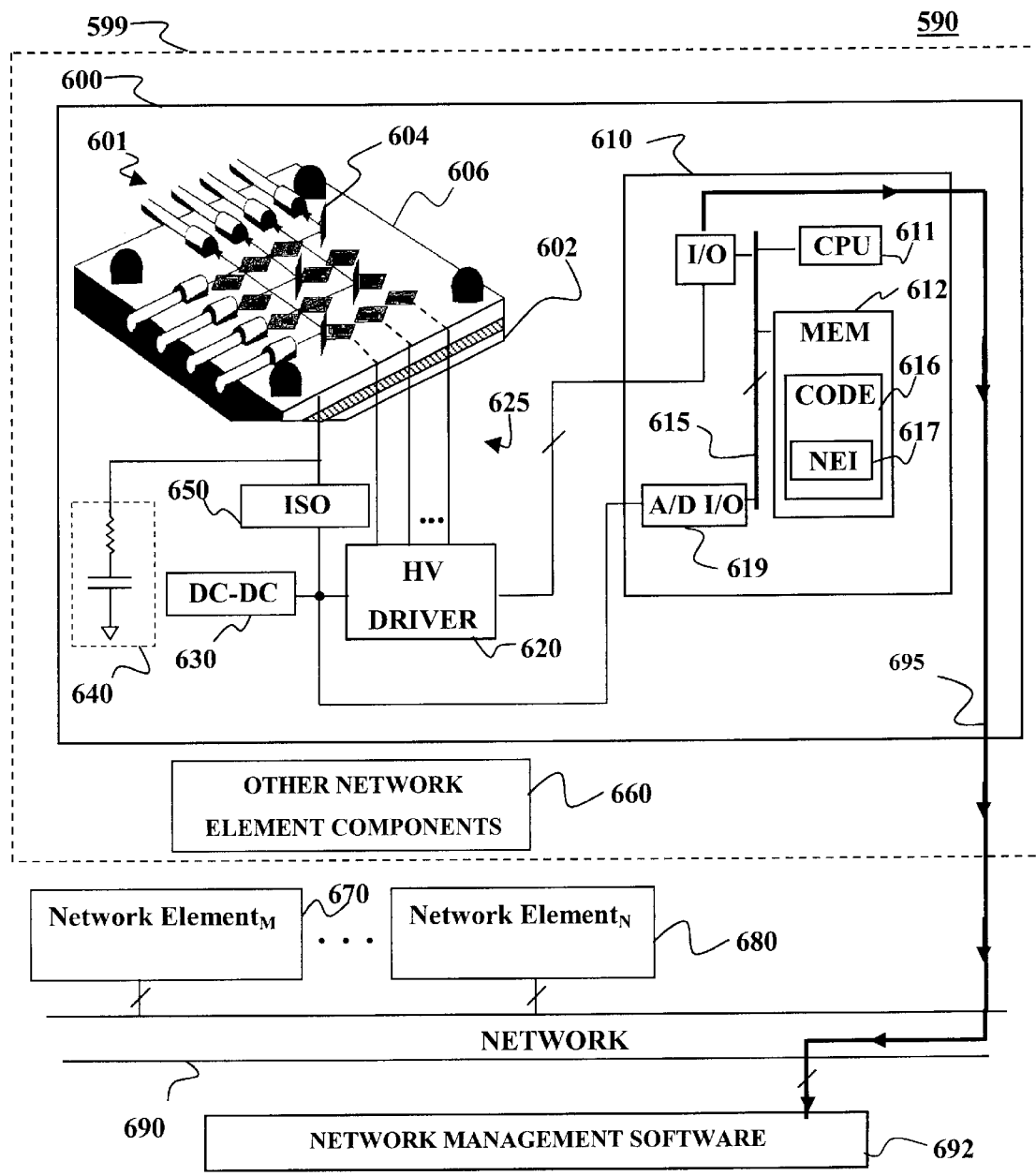
FIG. 6 is a schematic diagram of a system for maintaining the state of a MEMS device in the event of a power failure according to an alternative embodiment of the invention.
Figure 7:
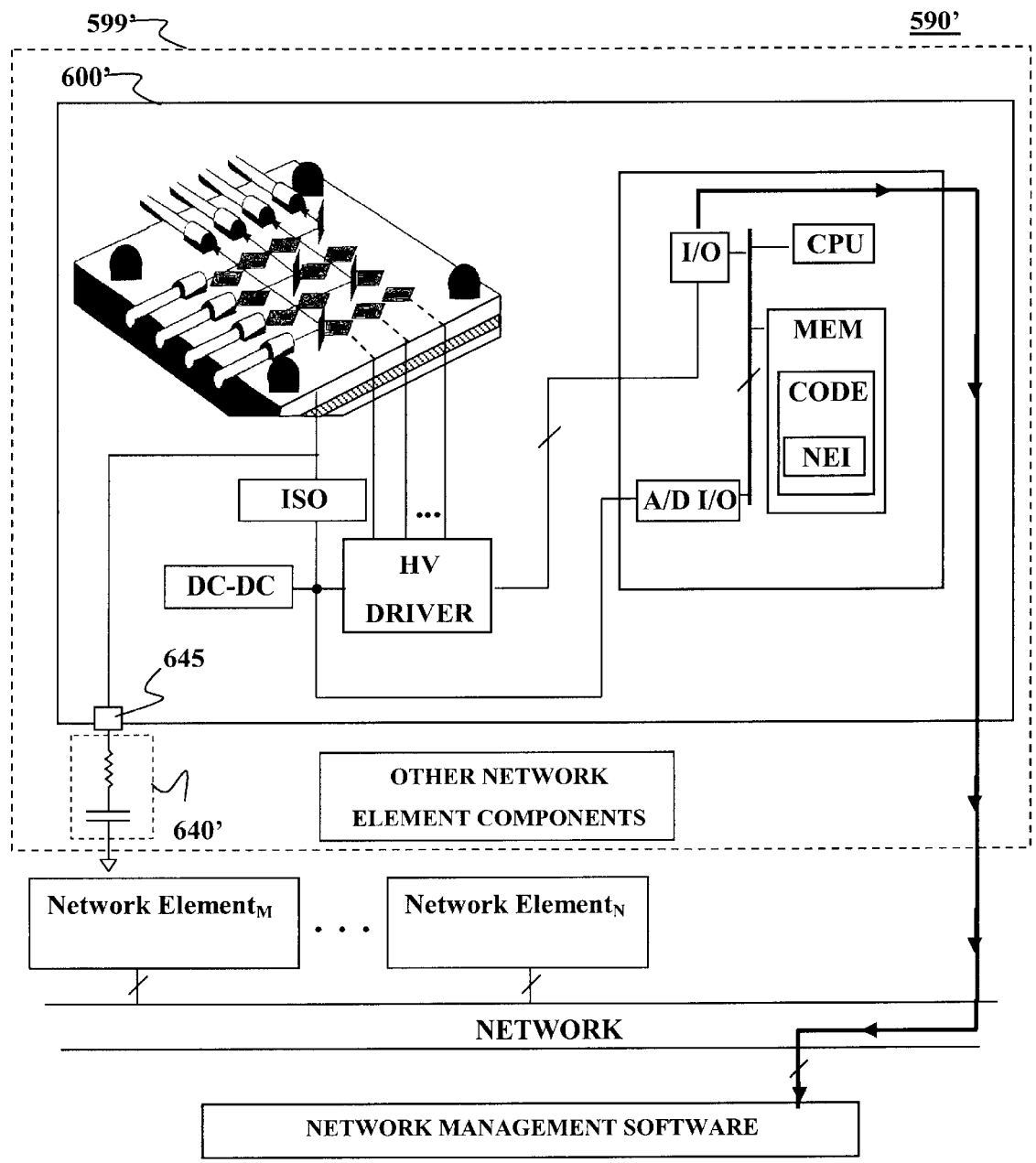
FIG. 7 is a schematic diagram of an alternative system for maintaining the state of a MEMS device in the event of a power failure according to an alternative embodiment of the invention.

An alternative system 590' is depicted in FIG. 7. The system 590' has features in common with the system 590 of FIG. 6. Specifically, the system 590' has a network element 599' and switch fabric 600' with a charge storage circuit 640'. These elements are configured in a substantially similar fashion to that shown and described with respect to FIG. 6. However, the charge storage circuit 640' is separate from the switch fabric 600' and is coupled to it through a port 645. Thus, the charge storage circuit may be provided, e.g., sold, separately from the switch fabric 600' and the other components in the system 590'.

Referring back to FIG. 2, at optional step 210 the controller 610 may implement a controlled shutdown feature during power failure. The controlled shutdown may include, but is not limited to, saving the state of the switch 601 in the memory 612 and communicating to the host Network Element 599 the fact that the switch 601 lost power at a particular time, e.g., mm:dd:yy at hh:mm:ss. This is useful because it allows the Network Element 599 or higher-level switch that controls the switch fabric 600, of which the switch 601 may be a part, to trigger maintenance alarms 695 with respect to the discharge and time remaining in the latching period. The alarms 695 may be communicated to the network management software 692 or to the network element 599. Flags triggered by the alarms 695 can also be stored in the memory 612, e.g. FLASH memory, with the state of the switch to enable certain actions to be taken on power up after the switch has recovered power. These actions may include informing the Network Element that power has been recovered.

The method 200 may also optionally include related features such as a controlled shutdown and boot-up. During power failure detect, the controlled shutdown feature may save the current state of the switch 601. In the event of a power failure, there is often a time lag, e.g. al milliseconds of clock cycle time remaining before the value of $V_{CC}$ drops below a level at which the controller ceases to function. During this interval, the controller program code 616 may execute instructions for the controller 610 to signal the host Network Element 599 with the event, date and time the switch fabric lost power. By signaling the Network Element 599 during shutdown, the Network Element 599 can prioritize maintenance alarms with respect to discharge period and track the time remaining in the latching period, i.e., the time remaining before charge leaks from the clamping surface 606 to the point that there is no longer sufficient force to clamp the moveable element in the "ON" position. With reference to FIG. 6, the signal alarm 695 transmitted to the Host Network Element 599 may be relayed to the network 690 so that network management control software 692 that manages control of the network elements 599, 670, 680 can manage network resources in a contingency plan. The network management software 692 generally keeps track of and controls the inventory of network element assets. When a signal alarm 692 is transmitted from the network element 599, it may contain a node I.D. enabling network management software 692 to reference in a database those features associated with the network element node. As so the network management software 692 may derive from the signal alarm the amount of latching time associated with the network element 599 which can then be used to trigger and prioritize maintenance schedules and redirect traffic in response to the downed system. It should be understood that the signal alarm, 695 itself may include data encoding the latching duration associated with downed system.

In addition to notification of power failure, the program code in the system of FIG. 3 may also direct the controller 610 to flag the power failure event in a non-volatile memory, e.g., a FLASH memory, to enable a smart boot-up of the fabric, so that the fabric can handle special circumstances and signal the network element on power recovery, such as signaling an alarm to the host network element so that itself and/or the network management software can be configured in response thereto.

Referring to both FIG. 3 and FIG. 6, when the power returns after a power failure, the DC-DC converter 330, 630 may require some finite amount of time to ramp up to the clamping voltage $V_{clamp}$. To restore the state of the switch 301, 601 it is often desirable to include in the method 200 an optional step 212 of doing a proper power-up sequence for the HV driver 320, 620 and restoring the states of the HV driver outputs 325, 625. Furthermore, when the power returns after a power failure, the DC-DC converter 330, 630 may require some finite amount of time to ramp up to the clamping voltage $V_{clamp}$. The method 200 may include a step 214 of waiting for a voltage provided by the source of clamping voltage $V_{clamp}$ (e.g., the DC-DC converter 330) to ramp up to the clamping voltage level $V_{clamp}$ in the event power returns after the power failure. This step is useful if an opto-isolator, photoMOS relay, or other such bi-directional current switching device is used to isolate the clamping surface from the DC-DC converter. If the output of the DC-DC converter 330, 630 were applied to the top chip 306, 606 in this manner before the output voltage has reached the minimum clamping voltage $V_{clamp}$, the top chip 306, 606 will experience a sudden dropout in clamping voltage and the moveable elements 304, 604 being held up may drop. By way of example, the controller 310, 610 may be programmed to read the voltage produced by the DC-DC converter 330, 630 to ensure that the desired clamping voltage level has been attained. Alternatively, the controller 310, 610 may be programmed to wait for a predetermined amount of time that is sufficient to allow the DC-DC converter to ramp up to the clamping voltage level. In either case, the source of clamping voltage may subsequently be reconnected to the clamping surface 306, 606 in step 216. Some systems may require all of steps 202–216 to ensure that the moveable elements 304, 604 do not fall in the event of a power failure. In the diode switching implementation of FIG. 5, however, clamping voltage dropout is less likely due to the unidirectional current regulation characteristic of the diode 550 and thus step 216 is unnecessary for this case.

While the above is a complete description of the preferred embodiment of the present invention, it is possible to use various alternatives, modifications and equivalents. It should be understood that the clamping voltages may take on various values and that the polarity of clamping components may be reversed; for example the clamping surface 306, 606 may be held at ground, the substrate 302, 602 may be held at 30 volts, and 30 volts may be applied to the movable element(s) 304, 604 to clamp it in the ON state. It should be understood that the clamping surface 306, 606 may exert an electric force on the movable element such that the moveable element(s) 304, 604 need not make physical contact with the respective clamping surface 306, 606. It should also be understood that, though specific example applications are shown that relate to a specific sub-field of optical communications, the present invention may be applied to maintain the state of a MEMS device in a variety of other applications within optical communications as well as other applications utilizing MEMS moveable elements. Such applications may include or relate to, but are not limited to, waveguides, relays, mixers, pumps, accelerometers, RFMEMS, bioMEMS etc. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed:

1. A method for maintaining the state of a MEMS device in the event of a power failure, the MEMS device having one or more MEMS elements moveably coupled to a substrate and at least one clamping surface for holding at least one element in a fixed state, the method comprising:

coupling a charge-storing circuit between the clamping surface and an electrical ground applying a clamping voltage between the clamping surface and at least one MEMS element to retain the at least one MEMS element against the clamping surface; and in the event of a power failure, isolating one or more electrical leakage paths from the clamping surface.

2. The method of claim 1 wherein the charge-storing circuit includes a capacitor.

3. The method of claim 1 wherein the MEMS device is an optical cross-connect switch.

4. The method of claim 1 wherein the MEMS element includes a light-deflecting component.

5. The method of claim 4 wherein the light-deflecting component is a mirror.

6. The method of claim 1 wherein the clamping surface is a top chip.

7. The method of claim 1 wherein the clamping surface for each MEMS element includes two vertical walls.

8. The method of claim 1 wherein the charge-storing circuit includes a capacitor having a capacitance of less than about 20 microfarads.

9. The method of claim 1 wherein the power detection occurs by monitoring voltage levels.

10. The method of claim 9 wherein the voltage monitoring occurs in real-time.

11. The method of claim 9 wherein a microcontroller monitors voltage levels.

12. The method of claim 1 further comprising the step of signaling a Network Element as power is failing.

13. The method of claim 12 wherein the MEMS device is an optical cross-connect switch.

14. The method of claim 13 wherein the signaling step includes providing date and time information to the Network Element.

15. The method of claim 14 wherein the host Network Element also communicates an alarm signal to indicate power failure event.

16. The method of claim 15 wherein the alarm signal generated by the Network Element enables other network devices to determine the length of time the cross-connect switch can sustain its state before the charge-storing circuit discharges.

17. The method of claim 1 wherein the source of clamping voltage is isolated from the clamping surface by an optical isolator.

18. The method of claim 1 wherein the source of clamping voltage is isolated from the clamping surface by a diode.

19. The method of claim 1, wherein the source of voltage includes a high voltage driver, the method further comprising:

in the event power returns after the power failure, performing a power-up sequence for the high voltage driver, and restoring one or more output states of the high voltage driver.

20. The method of claim 1, further comprising:

in the event power returns after the power failure, waiting for a voltage provided by the source of clamping voltage to ramp up to a clamping voltage level; and subsequently reconnecting the source of clamping voltage to the clamping surface.

21. The method of claim 20, further comprising:

signaling a host Network Element.

22. An apparatus for maintaining the state of a MEMS device in the event of a power failure, the MEMS device having one or more MEMS elements moveably coupled to a substrate and a clamping surface that is electrically isolated from the substrate, the apparatus comprising a charge-storing circuit electrically coupled between the clamping surface and an electrical ground;

an isolator element electrically coupled between the clamping surface and a source of a clamping voltage, wherein the isolator element is configured to electrically isolate the source of clamping voltage from the clamping surface in the event of a power failure.

23. The apparatus of claim 22 wherein the charge-storing circuit provides sufficient electrical isolation between the clamping surface and a ground potential such that the clamping surface retains sufficient clamping voltage to retain the at least one MEMS element for at least twenty-four (24) hours after the power failure.

24. The apparatus of claim 22 wherein the isolator element is an opto-isolator.

25. The apparatus of claim 22 wherein the isolator element is a low leakage diode.

26. The apparatus of claim 22 further comprising a voltage driver coupled to the source of clamping voltage and one or more of the MEMS elements, wherein the voltage driver selectively couples the source of clamping voltage to the one or more MEMS elements.

27. The apparatus of claim 22 further comprising a microcontroller coupled to the voltage driver.

28. The apparatus of claim 22 wherein the charge-storing circuit includes a capacitor.

29. The apparatus of claim 28 wherein the capacitor has a capacitance of less than about 20 microfarads.

30. An apparatus for maintaining the state of a MEMS device in the event of a power failure, the MEMS device having one or more MEMS elements moveably coupled to a substrate and a clamping surface that is electrically isolated from the substrate, the apparatus comprising:

a port for electrically coupling a charge-storing circuit between the clamping surface and an electrical ground;.

an isolator element electrically coupled between the clamping surface and a source of a clamping voltage, wherein the isolator element is configured to electrically isolate the source of clamping voltage from the clamping surface in the event of a power failure.

31. The apparatus of claim 30 wherein the port is through a package of a switch fabric.

32. The apparatus of claim 30 further comprising a charge storage circuit coupled to the port.

33. The apparatus of claim 32 wherein the charge storage circuit includes a capacitor.

34. The apparatus of claim 33 wherein the capacitor is not sold with rest of the apparatus.

* * * * *